United States Patent [19]
Matsuki et al.

[11] Patent Number: 5,259,042
[45] Date of Patent: Nov. 2, 1993

[54] BINARIZATION PROCESSING METHOD FOR MULTIVALUED IMAGE AND METHOD TO FORM DENSITY PATTERN FOR REPRODUCING BINARY GRADATIONS

[75] Inventors: Hiroshi Matsuki, Moriguchi; Yukihiko Takahashi, Higashimurayama, both of Japan

[73] Assignee: Toyo Ink Mfg. Co. Ltd., Tokyo, Japan

[21] Appl. No.: 616,159

[22] Filed: Nov. 20, 1990

[30] Foreign Application Priority Data

Nov. 21, 1989 [JP] Japan .................................. 1-302464
Feb. 16, 1990 [JP] Japan .................................. 2-35774

[51] Int. Cl.⁵ .............................................. G06K 9/38
[52] U.S. Cl. ................................ 382/50; 358/458; 358/466

[58] Field of Search .................... 382/50–53; 358/298, 75, 80, 458, 466, 296

[56] References Cited

U.S. PATENT DOCUMENTS

| | | | |
|---|---|---|---|
| 4,626,901 | 12/1986 | Tanioka | 358/296 |
| 4,673,971 | 6/1987 | Ikuta et al. | 358/298 |
| 4,742,400 | 5/1988 | Tsuji | 358/458 |
| 4,783,837 | 11/1988 | Kawamura et al. | 382/50 |
| 4,890,121 | 12/1989 | Hirahara et al. | 358/298 |

*Primary Examiner*—Jose L. Couso
*Attorney, Agent, or Firm*—Martin A. Farber

[57] ABSTRACT

A high quality binary valued image is reproduced from a multivalued original image by a combination of density pattern processing and error diffusion processing using density patterns prepared previously in correspondence to each density value of pixels of an image to be reproduced.

15 Claims, 17 Drawing Sheets

FIG.1

| $a_{1,1}$ | $a_{1,2}$ | | $a_{1,n}$ | $a_{1,n+1}$ | $a_{1,n+2}$ | $a_{1,n+3}$ |
|---|---|---|---|---|---|---|
| $a_{2,1}$ | $a_{2,2}$ | | $a_{2,n}$ | $a_{2,n+1}$ | $a_{2,n+2}$ | |
| | | | | | | |
| $a_{m,1}$ | $a_{m,2}$ | | $a_{m,n}$ | $a_{m,n+1}$ | $a_{m,n+2}$ | |
| $a_{m+1,1}$ | $a_{m+1,2}$ | | $a_{m+1,n}$ | $a_{m+1,n+1}$ | $a_{m+1,n+2}$ | |
| $a_{m+2,1}$ | $a_{m+2,2}$ | | $a_{m+2,n}$ | $a_{m+2,n+1}$ | | |
| $a_{m+3,1}$ | $a_{m+3,2}$ | | $a_{m+3,n}$ | | | |

FIG. 2

| HIERARCHY | AREA-TYPE DENSITY EXPRESSION VALUE | GRADATION THRESHOLD (BINARY NOTATION) $2^7 \quad 2^0$ | DECIMAL NOTATION | REFERENCE VALUE (BINARY NOTATION) $2^7 \quad 2^0$ | DECIMAL NOTATION |
|---|---|---|---|---|---|
| $C_0$ | 0 | 0 0 0 0 0 1 1 1 | 7 | 0 0 0 0 0 0 0 0 | 0 |
| $C_1$ | 1 | 0 0 0 1 0 1 1 1 | 23 | 0 0 0 1 0 0 0 0 | 16 |
| $C_2$ | 2 | 0 0 1 0 0 1 1 1 | 39 | 0 0 1 0 0 0 0 0 | 32 |
| $C_3$ | 3 | 0 0 1 1 0 1 1 1 | 55 | 0 0 1 1 0 0 0 0 | 48 |
| $C_4$ | 4 | 0 1 0 0 0 1 1 1 | 71 | 0 1 0 0 0 0 0 0 | 64 |
| $C_5$ | 5 | 0 1 0 1 0 1 1 1 | 87 | 0 1 0 1 0 0 0 0 | 80 |
| $C_6$ | 6 | 0 1 1 0 0 1 1 1 | 103 | 0 1 1 0 0 0 0 0 | 96 |
| $C_7$ | 7 | 0 1 1 1 0 1 1 1 | 119 | 0 1 1 1 0 0 0 0 | 112 |
| $C_8$ | 8 | 1 0 0 0 0 1 1 1 | 135 | 1 0 0 0 0 0 0 0 | 128 |
| $C_9$ | 9 | 1 0 0 1 0 1 1 1 | 151 | 1 0 0 1 0 0 0 0 | 144 |
| $C_{10}$ | 10 | 1 0 1 0 0 1 1 1 | 167 | 1 0 1 0 0 0 0 0 | 160 |
| $C_{11}$ | 11 | 1 0 1 1 0 1 1 1 | 183 | 1 0 1 1 0 0 0 0 | 176 |
| $C_{12}$ | 12 | 1 1 0 0 0 1 1 1 | 199 | 1 1 0 0 0 0 0 0 | 192 |
| $C_{13}$ | 13 | 1 1 0 1 0 1 1 1 | 215 | 1 1 0 1 0 0 0 0 | 208 |
| $C_{14}$ | 14 | 1 1 1 0 0 1 1 1 | 231 | 1 1 1 0 0 0 0 0 | 224 |
| $C_{15}$ | 15 | 1 1 1 1 0 1 1 1 | 247 | 1 1 1 1 0 0 0 0 | 240 |
| $C_{16}$ | 16 | $\infty$ | $\infty$ | 1 0 0 0 0 0 0 0 0 | 256 |

FIG. 3(A)
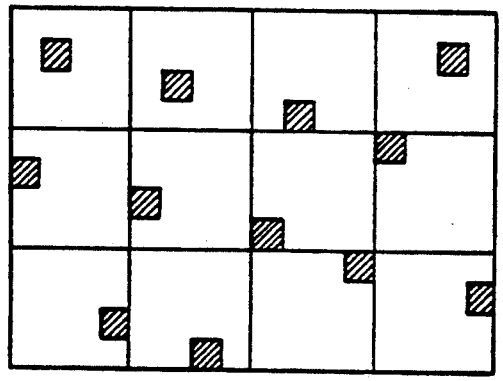
FIG.3(B)
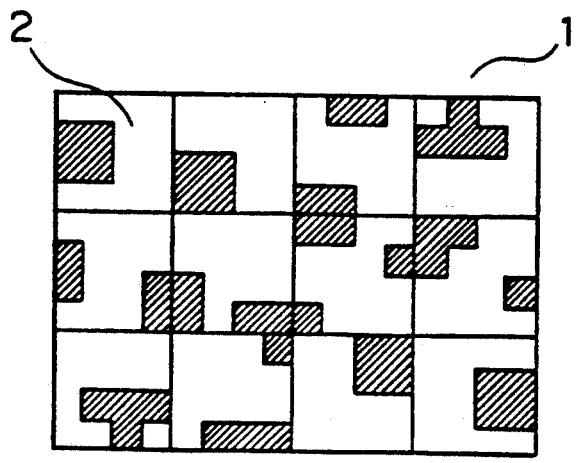
FIG.3(C)

FIG. 4
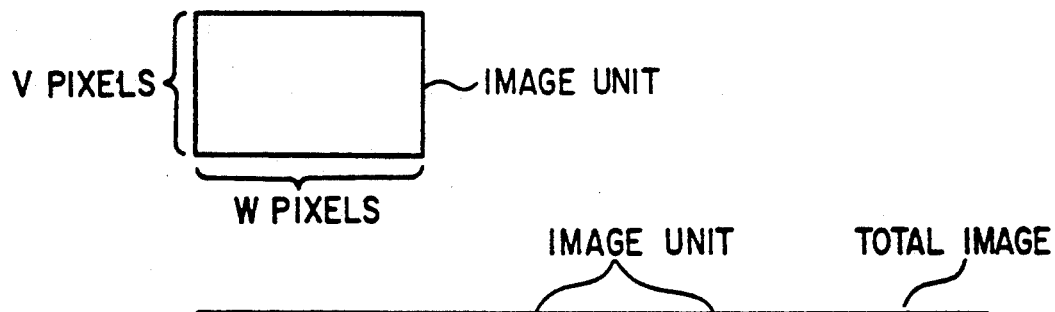
FIG. 5(A)
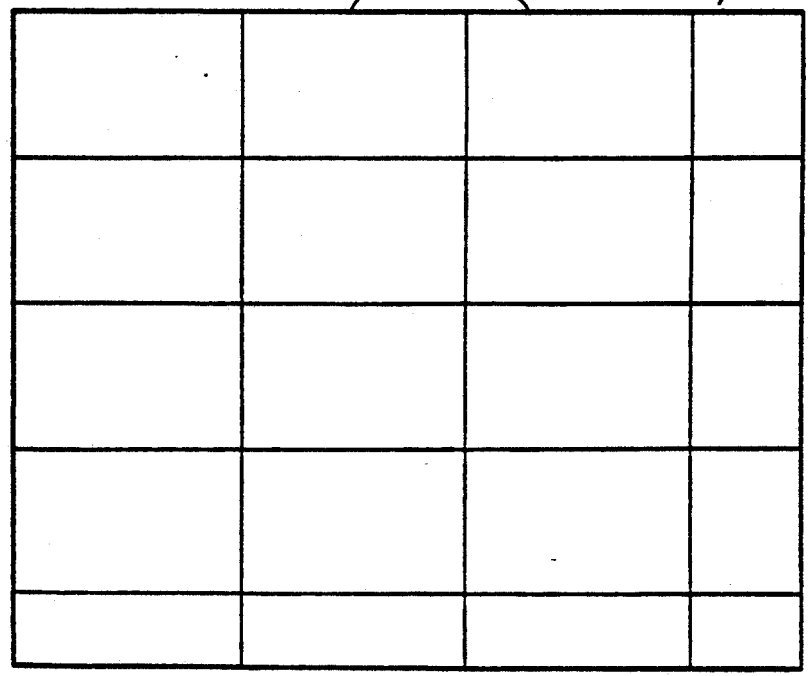
FIG. 5(B)

FIG. 6

| HIERARCHY | AREA-TYPE DENSITY EXPRESSION VALUE | GRADATION THRESHOLD (BINARY NOTATION) $2^7 \quad 2^0$ | DECIMAL NOTATION | REFERENCE VALUE (BINARY NOTATION) $2^7 \quad 2^0$ | DECIMAL NOTATION |
|---|---|---|---|---|---|
| C0 | 0 | 0 0 0 0 0 0 0 1 | 1 | 0 0 0 0 0 0 0 0 | 0 |
| C1 | 1 | 0 0 0 0 0 1 0 1 | 5 | 0 0 0 0 0 1 0 0 | 4 |
| C2 | 2 | 0 0 0 0 1 0 0 1 | 9 | 0 0 0 0 1 0 0 0 | 8 |
| C3 | 3 | 0 0 0 0 1 1 0 1 | 13 | 0 0 0 0 1 1 0 0 | 12 |
| C4 | 4 | 0 0 0 1 0 0 0 1 | 17 | 0 0 0 1 0 0 0 0 | 16 |
| C5 | 5 | 0 0 0 1 0 1 0 1 | 21 | 0 0 0 1 0 1 0 0 | 20 |
| ≈ | ≈ | ≈ | ≈ | ≈ | ≈ |
| C16 | 16 | 0 1 0 0 0 0 0 1 | 65 | 0 1 0 0 0 0 0 0 | 64 |
| ≈ | ≈ | ≈ | ≈ | ≈ | ≈ |
| C36 | 36 | 1 0 0 1 0 0 0 1 | 145 | 1 0 0 1 0 0 0 0 | 144 |
| ≈ | ≈ | ≈ | ≈ | ≈ | ≈ |
| C63 | 63 | 1 1 1 1 1 1 0 1 | 253 | 1 1 1 1 1 1 0 0 | 252 |
| C64 | 64 | ∞ | ∞ | 1 0 0 0 0 0 0 0 0 | 256 |

FIG. 8

$\theta = \tan^{-1} \frac{3}{4}$

FIG. 15(A)
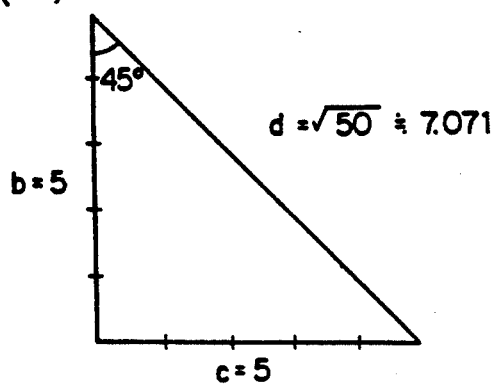
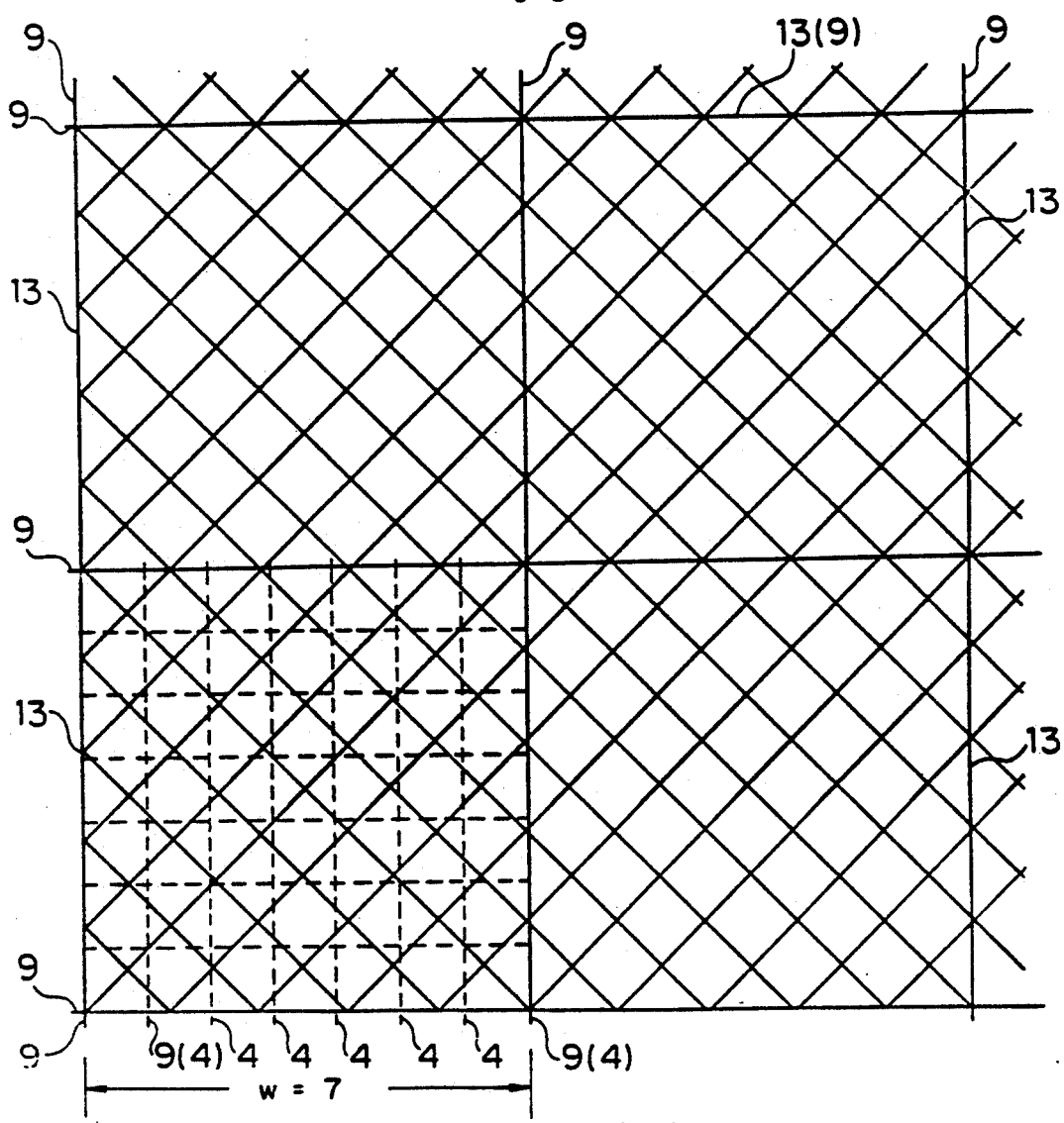
FIG.15(B)

$\theta = \tan^{-1}\dfrac{c}{b}$

FIG. 17

BINARIZATION PROCESSING METHOD FOR MULTIVALUED IMAGE AND METHOD TO FORM DENSITY PATTERN FOR REPRODUCING BINARY GRADATIONS

BACKGROUND OF THE INVENTION

The present invention relates to a binarization processing method for multivalued image to provide the compatibility of gradation and resolution when multivalued image, expressing the density gradations by multivalues, is reproduced as binary image based on printing dots, and it also relates to a method to form density pattern when binary gradation is reproduced by binary values of white and black (ON and OFF) printing dots from the multivalued image expressing the density gradation by multivalues.

When an image is reproduced, a binary gradation reproduction method is used, by which the density gradation of the image is expressed by changing the ratio of the area of the inked portion in small unit area on the image to be reproduced by ON-OFF control of a plurality of printing dots arranged in longitudinal and lateral directions in matrix form.

According to this method, printing can be achieved much easier compared with the density gradation method, by which the density of ink is changed or the thickness of applied ink is changed to express the gradation of density.

This method is called the area-type density expression method.

The area-type density expression method is roughly divided into dither method and density pattern method. According to the dither method, after the original image is divided into a plurality of pixels in matrix form and the gradation of density for each pixel is expressed by multivalues (e.g. 0, 1, 2, ..., 255), each printing dot is allocated to one pixel, and the gradation value of the inputted pixel is compared with the threshold corresponding to the position of said printing dot. If it is larger than the threshold, said printing dot is expressed as "black" (ON), and if it is smaller than the threshold, it is expressed as "white" (OFF), thus expressing by two gradations. On the other hand, according to the density pattern method, a group of printing dots of mn in quantity in the matrix form of m×n is allocated to one pixel, and it is expressed by one of the gradations of "mn+1" gradations of 0, 1, 2, ..., mn, which are expressed by the number of printing dots of "dark" (ON) in this group of printing dots.

The dither method provides higher resolution, while the density pattern method has higher gradation expression.

The present invention relates to the latter method.

TECHNICAL BACKGROUND

According to the method, digital multivalued image as inputted from the original image by scanner is reproduced through binary values by of a plurality of "black" and "white" printing dots arranged in matrix form. ("white" if the printing dot is not inked, and "black" if the printing dot is inked.) The density is expressed by the size of the inked area with the density of ink on a constant level. This method is called the area gradation method and is widely used because of its easy printing process compared with the density gradation method, by which density is expressed by changing the density of ink itself or the thickness of ink layer.

In such reproducing method, gradation and resolution become important issues.

Specifically, in the stage to input to scanner, the original image is divided into a plurality of pixels arranged in matrix form of k×l, and the gradation of density of each pixel is given by 8 bits in 256 steps from 0 to 255. With regard to the resolution of the inputted image, pixels are divided by the grids having 200–500 parallel lines per inch. The number of these parallel lines per inch may be smaller than the above.

On the other hand, in the output stage, there is physical restriction to the number of printing dots in the printer to express an image. At present, it is limited to 600 printing dots per inch.

If it is desired to increase the resolution of the reproduced image, it is possible to allocated each printing dot to each pixel of the input image (e.g. the number of the line per inch is set to 500 lines.) and to adopt the method to express darkness or light of the printing dot according to the gradation of the input pixel (dither method). The gradation value on the boundary between light and darkness to determine the light and darkness of each printing dot is called threshold.

If it is desired to increase the gradation, the number of the lines per inch is set to 200 lines and the number of printing dots is set to 600 printing dots per inch. Then, it is possible to allocate $3\times3=9$ printing dots for each input pixel, and the gradation in 10 steps can be provided by 9 printing dots. In other words, in case 0, 1, 2, ..., 9 dots are "black", a dark area (dots) in 10 different continuous steps is formed. This is called the density pattern method and it provides higher gradation. If the number of lines is set to 150 lines per inch and the number of printing dots is set to 600 printing dots per inch, $4\times4=16$ printing dots can be allocated to one pixel, and the gradation can be provided in 17 steps. If the number of lines is set to 300 lines per inch and the number of printing dots is set to 600 printing dots per inch, $2\times2=4$ printing dots can be allocated to one pixel, and the gradation can be provided in 5 steps.

According to this density pattern method, the number of printing dot "r" to be defined as "black" (ON) in the above "mn" printing dots is determined according to the gradation value of the input pixels as described above. For each of "r" (r=0, 1, 2, ..., mn), it is determined in advance which combination of "r" dots with "mn" printing dots is to be defined as "dark", i.e. the pattern depicted by "r" printing dots of "black" is determined in advance. This pattern is called density pattern.

There are various methods to determine the density pattern according to the purpose of the image. Particularly, in the field of printing, the most widely known method is that "black" (ON) printing dots are gathered together in circular or rectangular form at the center of unit area for "mn" printing dots. Such density pattern is called "mesh" because the OFF portion of the printing dot group looks like an imaginary mesh.

On the other hand, in color image, it is necessary to produce a block for each color. Because it is difficult to output the printing dots of different colors at exactly the same position, slight deviation occurs on the plates of each color if it is attempted to print at the same position, and moiré occurs. The smaller this deviation is, or the smaller the period of regular deviation is, the more the moiré effect is increased. To prevent moiré, it is necessary to extensively move the printing position and to deviate so that it does not occur regularly.

In case the density pattern is in mesh, moiré occurs if the directions of the meshes on two blocks are deviated in parallel. Thus, it is usually practiced to rotate one mesh relatively to the other.

Such technique to rotate the direction of the mesh to the direction of line (or row) of printing dots in printer is useful not only for the case a plurality of plates are used such as color printing but also in case printing is performed by one plate. In fact, it is generally said that the better printing can be provided when rotated by 45° than when the direction of mesh is coincided with the horizontal direction of the image.

EVALUATION OF BACKGROUND TECHNIQUE

The higher resolution can be obtained by the dither method, while the image looks monotonous because the gradation is expressed by light and darkness of the printing dots in unit area. According to the density pattern method, the more the number of dots is increased to obtain higher gradation, the fewer the number of the input pixels per inch is and the more the resolution is decreased.

To solve this problem and to compensate the gradation in the dither method, organizational dither method or error diffusion method are known.

Organizational dither method is a method, in which the threshold of gradation value in determining light and darkness of printing dots is changed periodically in the direction of dot arrangement so that the "black" printing dots are gathered periodically. In the error diffusion method, the error from the threshold of gradation value in determining light and darkness of printing dots is dispersed and added to gradation value of the input pixels in the surroundings, and light and darkness of the next printing dot is determined through comparison between the new gradation thus obtained and the threshold. The error is then diffused, and this procedure is repeated. Thus, the gradation of original image is reflected in the determination of light and darkness of the printing dots.

These methods have the same essential features that each printing dot is allocated to one inputted pixel, and the light and darkness of printing dots in the outputted image are independent for each printing dot and are discrete. Accordingly, monotonousness cannot be avoided. In the error diffusion method, the error diffusion must be calculated again to a plurality of gradation values for each printing dot. This results in enormous calculation procedure and involves time-consuming processing.

This problem is caused by the restriction on the number of printing dots usable for one image, and there has been developed a new technique to increase the number of printing dots to about 2,500. This is to form printing dots through printing on film by laser, and this is used for printing technique. When mesh system is adopted where the number of lines is set to 150 lines per inch and $8 \times 8 = 64$ printing dots are used to express 65 gradations, the number of printing dots per inch is: $150 \times 8 = 1,200$. This is still lower than the upper limits of the number of printing dots.

However, this method also has disadvantages; It requires large size and costly equipment.

On the other hand, the problems of the density pattern method are as follows: When mesh is to be generated with the halftone dots at rotated position in the density pattern method, each halftone dot after rotation, which comes to the position of each halftone dot before rotation, is deviated from of the original halftone dot except the case where the rotating angle $\theta$ is 0°, 90°, 180° and 270°. The mode of such deviation is divided into two types: The case where the same mode of deviation is repeated periodically at several halftone dots in X direction and Y direction according to the rotating angle $\theta$, and the case where it is not repeated at all. However, it is not repeated in almost all cases. This is because trigonometrical function of angle $\theta$ in general is an irrational number in almost all cases and the coordinates after rotation are expressed by this trigonometrical function.

In such case where the same mode of deviation is not repeated, as many density pattern as the number of all pixels constituting the image for each gradation value must be prepared and the density pattern determined by such gradation values and coordinates must be allocated to each pixel. This requires large size equipment.

In order to prepare all necessary density patterns in this case, ON-OFF conditions of the printing dots are taken into account in case the same density pattern is continuously repeated in longitudinal and lateral directions for each gradation value "r" when the gradation values of all pixels on the image are "r". The position of each imaginary printing dot, rotated by the angle $\theta$, is allocated to the position of the real printing dot, not rotated. That is, by allocating the imaginary printing dot at the position, approximating the position of each real printing dot to the position of such real printing dot, the density pattern of the group of printing dots corresponding to each pixel can be obtained. Because imaginary printing dots are overlapped on a single real printing dot or no imaginary printing dot is allocated to a real printing dot, some of the density patterns thus obtained have the gradation value different from "r" or have deformed pattern even when such error is corrected. In the plane of the same gradation value (the portion of the image where the pixels of the same gradation values continue in longitudinal and lateral directions) using such density pattern, the same gradation values cannot be expressed on the reproduced image, and the quality of the image is unavoidably low.

According to the dither method, each printing dot is allocated to one pixel and ON-OFF condition is determined by comparing with the threshold. Accordingly, to form the rotated halftone dots, a threshold table is prepared, in which smaller thresholds appear periodically for a plurality of printing dots in the direction of imaginary rotated mesh so that the dark dots appear periodically in the direction of the imaginary rotated mesh (organizational dither method).

Because this is the method to determine for each printing dot, much time is required for processing. When a new threshold table for the rotation at an arbitrary angle is to be obtained by rotating the threshold table at the rotating angle of 0°, the same deterioration of image quality occurs as in the above density pattern method.

The present invention is offered to solve these problems. It is an object of the present invention to provide a binarization processing method of multivalued image, in which binary values are outputted by an equipment where the number of printing dots per inch is not sufficient, and gradation is expressed by mesh system without decreasing the resolution below a certain level.

Thus, in case it is difficult to have sufficient number of printing dots mn (>1) to express such gradation the gradation as close to the desired level as possible can be attained.

Another object of the invention is to offer a method to form density pattern for reproducing binary gradation to shorten the processing time and to prevent moiré. By such method, it is possible to maintain excellent gradation of the density pattern method and the advantage of shorter processing time through collective input of a plurality of printing dots without requiring large size equipment, and to form density pattern of any desired form including the meshes on the screen rotated at any angle without disturbing the gradation values or pattern form and without preparing the density pattern for all pixels.

The other objects of this invention will become obvious from the descriptions as indicated below.

SUMMARY OF THE INVENTION

To attain the above objects, the binarization processing method for multivalued image of the first aspect of this invention is a binarization processing method for multivalued image for reproducing original image, comprising an image input unit for dividing the original image into a plurality of multivalued pixels arranged in matrix form of k lines and l rows, and an image output unit for expressing the output image by a plurality of binary valued dots arranged in matrix form of p lines and q rows, characterized in that said plurality of printing dots arranged in matrix form of p lines and q rows are divided into virtual mesh units formed in matrix form of k lines and l rows, that each mesh unit consists of a group of printing dots in matrix form of m lines and n rows (mn>1) that the gradation values of the input pixels are classified into "mn+1" hierarchies of $C_0$, $C_1$, ..., $C_r$, ..., $C_{mn}$ expressed by "mn" printing dots, that a reference value $N_r$(r=0, 1, ..., mn) representing the hierarchy $C_r$(r=0, 1, ..., mn) is provided, that an area-type density expression pattern table in matrix form of v lines and w rows is prepared as the area-type density expression pattern consisting of a group of printing dots of m lines and n rows where each element expresses the gradation r for each hierarchy $C_r$, that an area-type density expression pattern having line number of (y−1) mod (v)+1 and row number of (x−1) mod(w)+1 is outputted to the said mesh unit of y line and x row of output image from the area-type density expression pattern table for gradation value of $a_{y,x}$ of input pixel of x line and y row, that the error $a_{y,x} - N_r$ occurred in this case is dispersed and added to the gradation value of the surrounding pixels according to the size of the coefficient in the diffusion coefficient matrix, which relatively corresponds to the position of said input pixel, that said binary output is performed to the next new gradation value thus obtained and the error is diffused, and that the above procedure is subsequently repeated.

The method to form the density pattern for reproducing binary value gradation of the second aspect of this invention is a method to form density pattern for reproducing binary gradation using an area-type density expression pattern table, in which said area-type density expression pattern table is obtained in such a manner that a basic output priority matrix of h lines and i rows having output priority rank as the element is prepared, a rotated basic output priority matrix is obtained by repeating said basic output priority matrix in X and Y directions and rotating it by the angle θ, then output priority matrices corresponding to mesh units of V lines and W rows is obtained in which the element of said output priority matrices corresponds to equal or nearest element of said rotated output priority matrix, and in each mesh unit the printing dots are outputted in the order of element of said output priority matrix according higher priority to form said area-type density expression pattern table, as the result, density patterns of hierarchy of 0, 1, 2 ..., mn can be expressed.

EFFECT OF THE INVENTION

In the binarization processing method for multivalued image with such arrangement, when the level of necessary resolution, i.e. the number of lines to divide the pixels, is selected, the number of printing dots mn in one grid to be used for gradation expression is determined. To the gradation value $a_{y,x}$ of one pixel, the hierarchy $C_r$, to which it belongs, is determined and the area-type density expression pattern table corresponding to the hierarchy $C_r$ and x, y and the next upper area-type density expression pattern are determined, and the area-type density expression pattern is outputted by binary values by the group of "mn" printing dots at the positions on the grid corresponding to $a_{y,x}$.

On the other hand, the gradation of input pixel $a_{y,x}$ is compared with the reference value $N_r$, which represents the hierarchy $C_r$, and the error $a_{y,x} - N_r$ occurred is dispersed and added to the gradation value of the surrounding pixels according to the size of the coefficient in the diffusion coefficient matrix relatively corresponding to the position of said pixel.

The gradation value of the next pixel (e.g. $a_{y+1,x}$) is a new gradation value obtained as the result of error diffusion. To this gradation value, the group of the new "mn" printing dots on the upper position of the corresponding grid is outputted by binary values as the area-type density expression pattern corresponding to the coordinates of the belonging hierarchy and the pixels, and the error is diffused. By repeating this procedure, all groups of printing dots in the grid are outputted by binary values as the area-type density expression pattern respectively, and the original image is reproduced.

The reproduction thus obtained has the gradations of "mn+1" steps, and the gradation is increased because error is diffused to the surroundings.

Unlike the case of the dither method, the error diffusion is calculated not for each printing dot but for each group of "mn" printing dots. Thus, calculation is completed by 1/mn times, and the time for processing is reduced.

In case the area-type density expression pattern table is prepared, the basic output priority matrix of h lines and i rows is prepared according to the shape of the density pattern, and the number of lines V and the number of rows W of one block are selected according to the rotating angle θ. The repeated unit matrix is obtained by repeating the basic output priority matrix in X and Y directions rotating it by the angle θ, where the element (output priority rank) occupying the position near each printing dot in said block is allocated to said printing dot.

This repeated unit matrix corresponds to one block, i.e. small group of "VW" printing dots in small group of "VW" grids, and the table where the repeated unit matrix is repeated in X and Y directions corresponds to all images.

The repeated unit matrix consists of "VW" partial matrices of m lines and n rows. In case $\theta \neq 0°$, all of these are different from each other, and one partial matrix corresponds to one grid. On the above table, one of said partial matrices corresponding to the grid of the coordinates (X, Y) is determined, and this is used as the output priority matrix corresponding to the coordinates (X, Y). The elements contained in an output priority matrix "mn" elements (overlapping allowed) of the output priority matrix expressed by natural number from 1 to hi. By outputting the printing dots, which correspond to these elements from higher output priority, the density pattern for the gradations 0, 1, 2, ..., mn can be obtained.

In case the density pattern is the rotated mesh, the values of V and W are selected that the shape and the size of halftone dot are approximately maintained at the connections between blocks.

Specifically, in order that the size of halftone dot becomes the same in case the rotating angle $\theta = 0°$ and in case $\theta \neq 0°$, the spacings between the elements in the matrix where basic output priority matrix of h lines and i rows are repeated in X and Y directions are adjusted, and these are multiplied by m/h times in X direction and by n/i times in y direction.

Moreover, in case (a) $\tan \theta = (n \cdot c)/(m \cdot b)$ or $\tan \theta \approx (n \cdot c)/(m \cdot b)$, and (b) $b^2 + c^2 = d^2$ or $b^2 + c^2 \approx d^2$, a combination of integers b, c and d satisfying both conditions (a) and (b) is selected, and V = W = d.

In this case, the total image is such that a square having its side equal to the grid $\sqrt{b^2+c^2}$ is repeated in X and Y directions. By approximating $\sqrt{b^2+c^2}$ by d, continuous halftone dots can be formed on the connections of such repeating.

Accurately, however, the pattern portion having the grid of $|\sqrt{b^2+c^2} - W|$ are overlapped and cut off, and the halftone dots are slightly bigger or smaller than in other portions.

When it is desired to cancel this difference of meshes from the other portions on this repeating connections, said matrix is enlarged or reduced, and it is multiplied by $(d/\sqrt{b^2+c^2}) \cdot (m/h)$ times in X direction and by $(d/\sqrt{b^2+c^2}) \cdot (n/i)$ times in Y direction so that the arrangement of the elements in square having the grid of $\sqrt{b^2+c^2}$ corresponds to the group of printing dots in a square of d×d. In this case, the same halftone dot as in the other portions is formed on the connection of repeatings.

BRIEF DESCRIPTION OF THE DRAWINGS

FIG. 1 shows the gradation values of input pixels arranged in matrix form;

FIG. 2 is a table to show an example of the procedures to divide the gradation values to hierarchies and to determine the reference values in case the gradation takes the values from 0 to 256 and one mesh contains 16 printing dots;

FIG. 3 comprises FIGS. 3(A)–3(C), and represents examples of area-type density expression patterns, which correspond to the area-type density expression values of the hierarchies of FIG. 2, wherein FIG. 3(A) shows an area-type density expression value pattern with gradation value 0, wherein FIG. 3(B) shows an area-type density expression value pattern with gradation value 1, and wherein FIG. 3(C) shows an area-type density expression value pattern with gradation value 4;

FIG. 4 shows an error diffusion coefficient matrix;

FIG. 5 comprises FIGS. 5(A) and 5(B), and explains the mutual relationship of pixel, image unit and total image;

FIG. 6 is a table to show the procedure to divide the gradation values into hierarchies and the procedure to determine reference values in case gradation takes the values from 0 to 256 and one mesh contains 64 printing dots;

FIG. 8 shows the repeated unit matrix used to prepare a binary gradation reproduction of FIG. 7;

FIG. 15 comprises FIGS. 15(A) and 15(B), and shows the procedure to determine the block size (size of the repeated unit matrix) in case $\theta = 45°$;

FIG. 16 comprises FIGS. 16(A) and 16(B), and represents the relation between $\theta$ and the block size for a general rotating angle $\theta$;

FIG. 17 gives the procedure to prepare a basic output priority matrix in the case of 32 lines and rows;

DESCRIPTION OF PREFERRED EMBODIMENT

Figure 7:
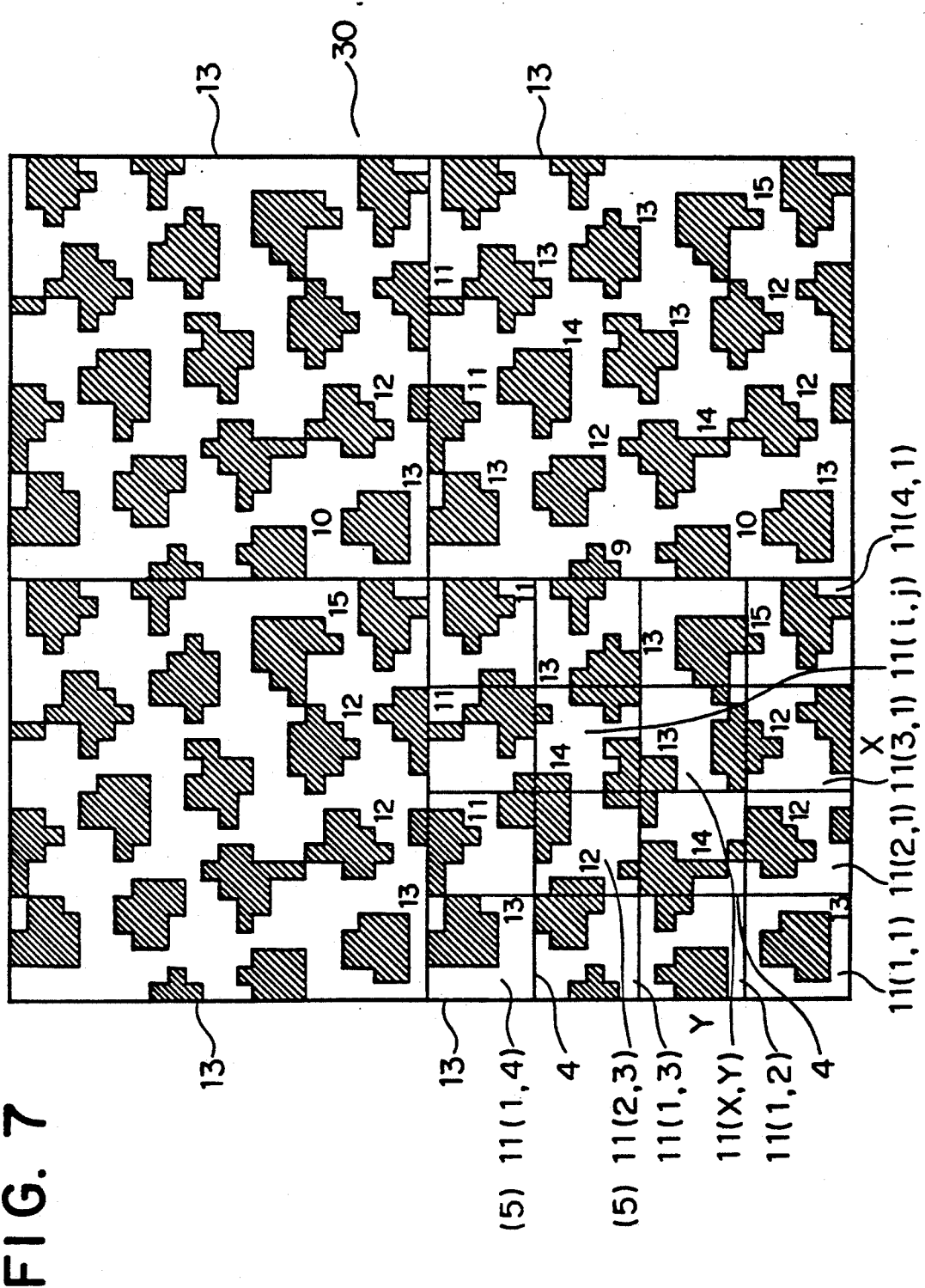
FIG. 7 represents binary gradation reproduction as depicted by the procedure to form an area-type density expression pattern table of this invention, where a plane of area-type density expression 13/36 is depicted by halftone dots with rotating angle $\theta = \tan^{-1}(\frac{1}{4}) = 14.1°$.
Figures 9, 13:
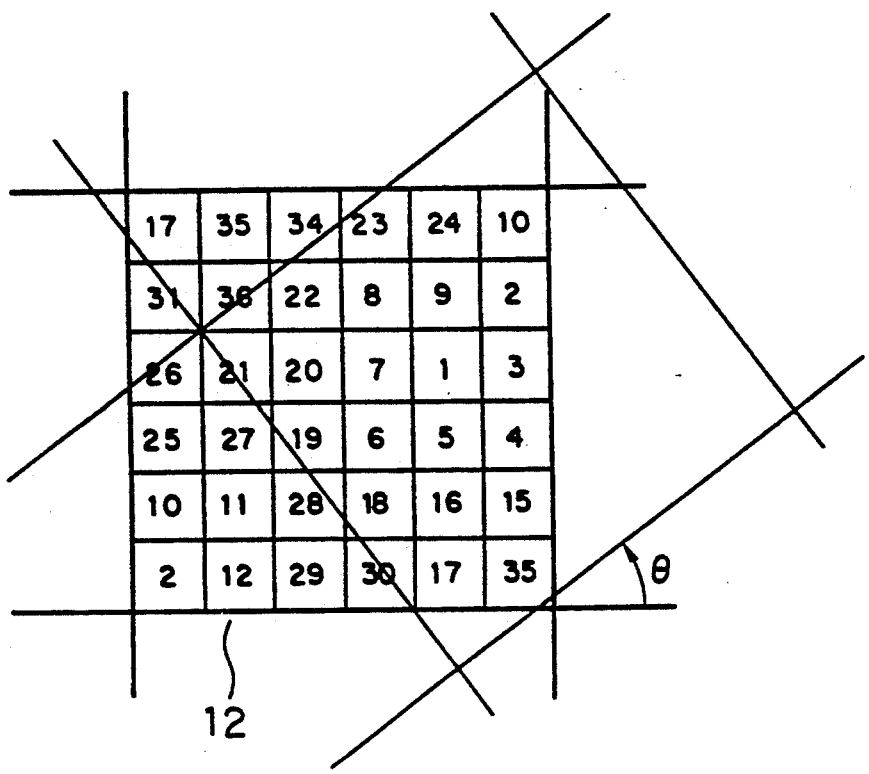
FIG. 9 shows a basic output priority matrix used for preparing the repeated unit matrix of FIG. 8.
FIG. 13 shows the output priority matrix.

In the following, the details of the invention are described in connection of the drawings of an embodiment.

When the number of halftone dots to determine the level of resolution is selected to 150 halftone dots per inch, a group of 4×4=16 printing dots is contained in one grid if the number of printing dots per inch is 600. Therefore, when an input unit is used, in which the gradation value of pixel is expressed by 0–256, each of the gradation values (FIG. 1) of all pixels is divided into 17 hierarchies.

To divide the hierarchy, the method of FIG. 2 may be taken. Namely, in FIG. 2, $C_0, C_1, C_2, \ldots, C_{16}$ are hierarchies, and each of these subscripts represents the number of printing dots (area-type density expression value) to be "black" of 16 dots, and it is indicated that the gradation value not exceeding the gradation threshold (in binary and decimal values) is indicated for each hierarchy. The negative value from the error diffusion as described later is included in $C_0$. Also, the values larger than 256 are included in $C_{16}$.

Reference value $N_r$ is provided in each hierarchy $C_r$.

In the example of FIG. 2, in view of the fact that the values from negative to 7 are included in $C_0$, the median 0 is regarded as the reference value $N_0$ of the hierarchy $C_0$. Because the numbers from 8 to 23 are included in $C_1$. Taking a median of these values, $N_1 = 16$, and the same applies thereafter.

However, the procedure to determine the hierarchy and the reference value is not limited to the above. It is possible to divide the hierarchy with unequal spacings according to human visual sensitivity or to select the gradation value not included in the hierarchy as reference value.

For each of the above area-type density expression values r (r=0, 1, 2, ..., 16), each element consists of a group of printing dots of 4 lines and 4 rows. By turning "r" dots of 16 dots to "dark", an area-type density expression pattern table in matrix form of 3 lines and 4 rows is prepared, which is an area-type density expression pattern to express r gradation (FIG. 3). The procedure to prepare an area-type density expression pattern table will be described in detail later.

Further, a diffusion coefficient matrix to be used for the error diffusion is prepared. This is to show diffusion coefficient for the range, in which error is to be diffused (In the figure, within $\alpha$ lines and within $\beta$ row from the gradation value in question.). As $\alpha$ and $\beta$, $\alpha=\beta=2$ or $\alpha=\beta=3$, etc. are used in view of the calculation speed.

To the gradation value $a_{1,1}$ of the first pixel, its belonging hierarchy is determined. For example, in case $a_{1,1}=68$, it is $C_4$. Therefore, the pattern given by 2 in the area-type density expression pattern table given by 1 in FIG. 3 is outputted in binary values by 16 printing dots in the halftone dot of the first grid, i.e. line 1 and row 1. The error in this case is: $68-N_3=68-64=4$. The error is diffused to the gradation value $a_{s,t}$ (s=1, 2, ..., $\alpha$; t=1, 2, ... $\beta$) within $\alpha$ line and $\beta$ rows according to the above mentioned diffusion coefficient matrix. Namely, the sum of the gradation value $a_{s,t}$ and $4 \times b_{s,t}/$(sum of all coefficients in the diffusion coefficient matrix (element)) is the new gradation value $a_{s,t}$.

The next gradation value $a_{2,1}$ is the value after the error diffusion as described above. For this $a_{2,1}$ the hierarchy is determined in the same way, and the area-type density expression in the corresponding area-type density expression pattern table is determined and is out-putted in binary values. The error is obtained, and this error is diffused to the gradation values within $\alpha$ lines and $\beta$ rows as counted from $a_{2,1}$. This procedure is performed to $a_{1,1}, a_{2,1}, ...$ in the main scanning direction of the scanner. When the first row is completed, the procedure is repeated to $a_{2,1}, a_{2,2}, ...$ in the second row, and then in the third row. In general, the pattern outputted in binary values to the pixel $a_{y,x}$ is an element having:

(y−1) mod (v)+1 as line number, and (x−1) mod (w)+1 as row number (consisting of a group of printing dots of m lines and n rows). When it is supposed that the error of gradation value $a_{y,x}$ is $D_{y,x}$ and that the total sum of the elements in diffusion matrix is B, the error to be diffused to the gradation values $a_{y+s-1, x+t-1}$ (s=1, 2, ... $\alpha$; t=1, 2, ... $\beta$) within $\alpha$ lines and $\beta$ rows as counted from $a_{y,x}$ is:

$D_{y,x} \times b_{s,t}/B$ and $a_{y+s-1, x+t-1} + D_{y,x} \times b_{s,t}/B$ becomes a new gradation value.

Thus, binary value output is completed for "k×l" pixels, and the total image is obtained.

FIG. 6 shows an example of the procedure to divide the hierarchy and the procedure to determine reference value in case the number of printing dots in a halftone dot is 64.

Next, description is given on the method to prepare the above area-type density expression pattern table.

Figure 18:
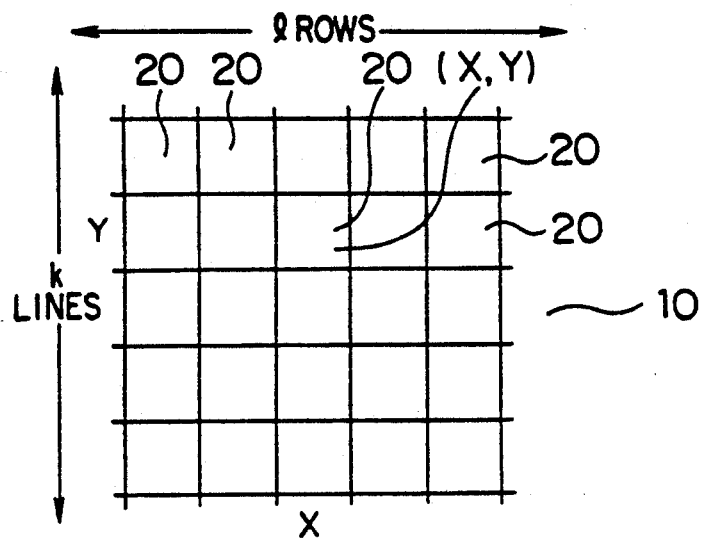
FIG. 18 shows the relationship of input image, pixels and coordinates (X, Y)

In FIG. 18, 10 represents an input image, and this input image 10 consists of the pixels 20 arranged in matrix form of k lines and l lines. The density gradation of the pixel 20 is expressed by multivalues, e.g. by one of the values from 0 to 255.

Figure 19:
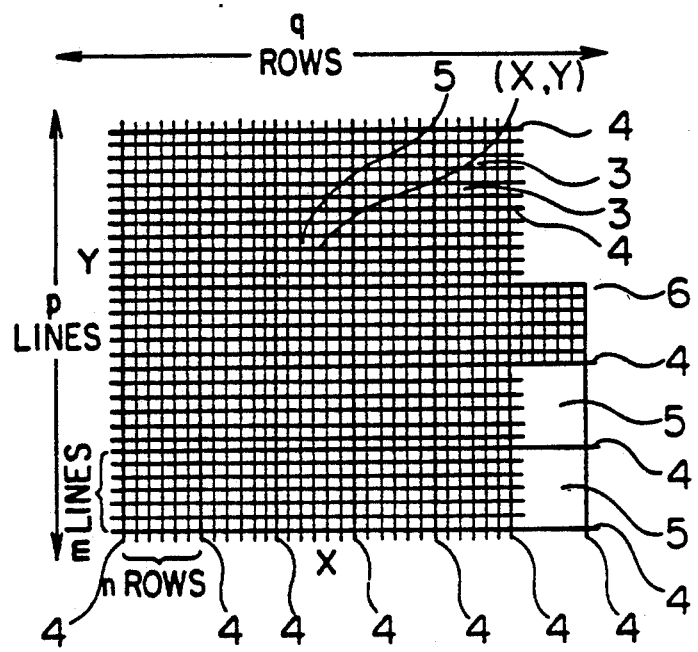
FIG. 19 shows the relationship of the group of printing dots, grids and coordinates (X, Y)

On the other hand, in FIG. 19, 3 is a printing dot of the output unit such as dot printer, and it comprises a group of printing dots arranged in matrix form of p lines and q rows. This group of printing dots is divided by the grid group 5 partitioned by virtual grid partition line 4, and one grid 5 contains a small group of printing dots 6 in partial matrix form having m lines and n rows (6 lines and 6 rows in the figure). The pixel 20 and the grid 5 correspond to each other by 1:1 through the coordinates (X, Y) having the line number on X coordinate, and row number in Y coordinate.

A small group of printing dots 6 consists of "mn" printing dots, and each printing dot can express two gradation of "inked" and "non-linked", i.e. "black" and "white" according to ON and OFF of the output. Each small group of printing dots 6 can express "mn+1" types (37 in the figure) of gradations of 0, 1, 2, ..., mn (36 in the figure) according to the number of ON printing dots. When the gradation value of each pixel 20 is expressed by the value r of the gradations of 0, 1, 2, ..., mn+1 according its size, and when "r" printing dots are turned to ON in the small group of printing dots 6 corresponding to the pixel 20, and the remainder is turned to OFF in binary value output, binary value gradation can be reproduced.

In the following, a method is described, in which the pattern to show which "r" printing dots of mn (=36) printing dots 3 of the smaller group of printing dots 6 are turned ON, i.e. the density pattern, is prepared to output according to the coordinates (X, Y) and the gradation r of the given pixel 20.

Figures 16A, 16B, 21:
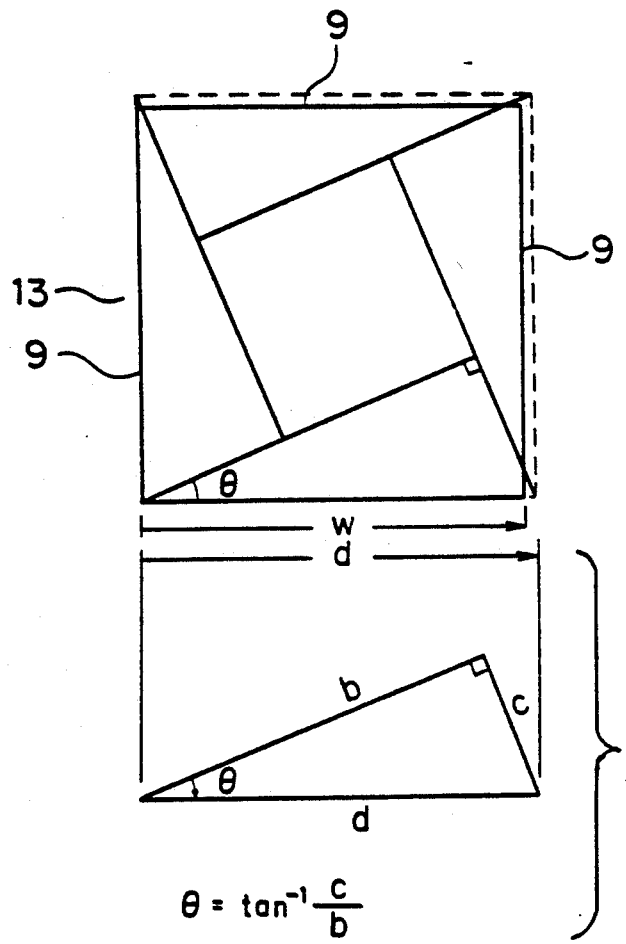
FIG. 21 is a basic output priority matrix.
Figure 20:
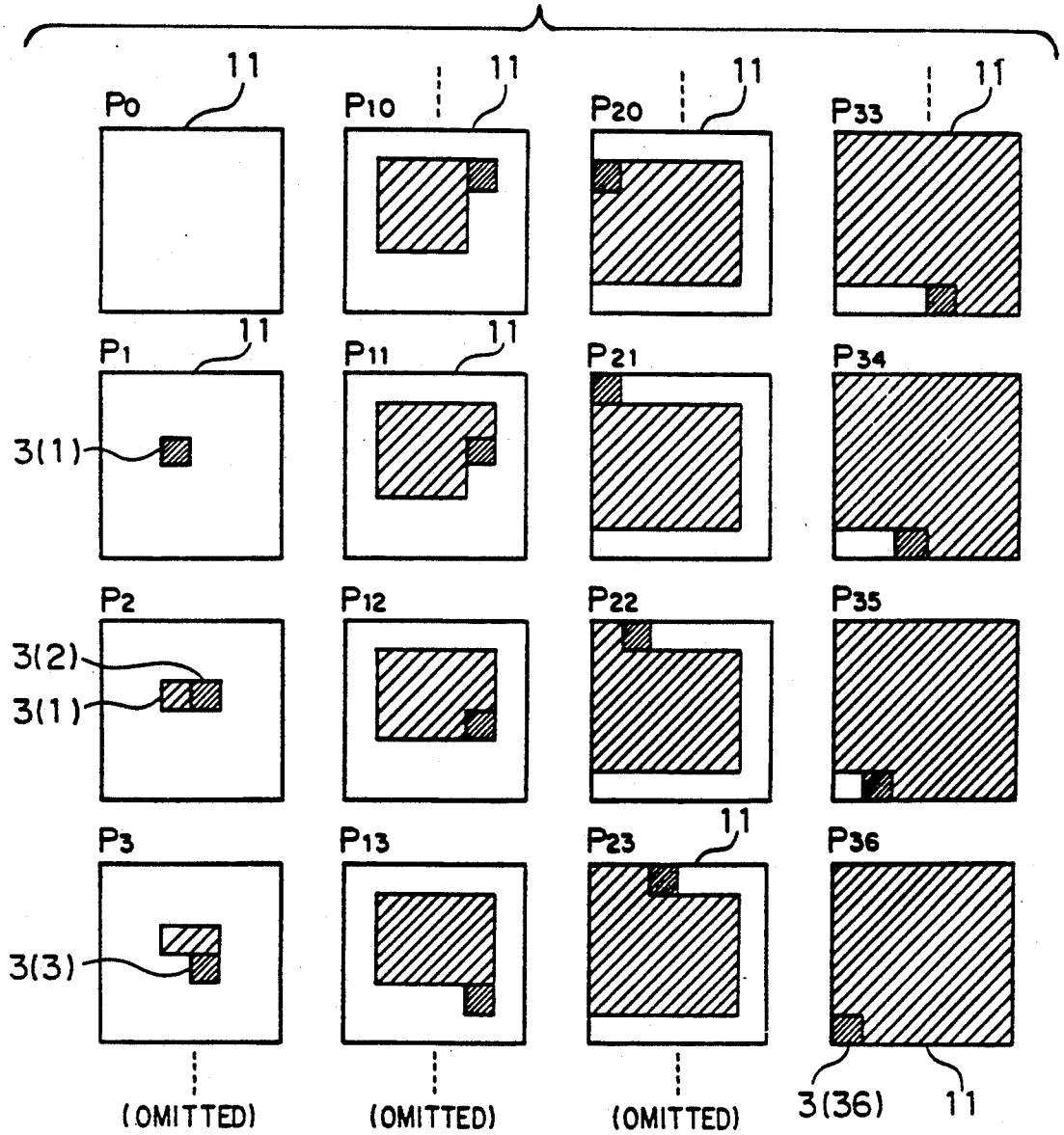
FIG. 20 represents the density pattern formed by the basic output priority matrix of FIG. 21.

In this method, when the density pattern having the gradation r of 0, 1, 2, 3, ..., mn (36 in the figure) is depicted as $P_0, P_1, P_2, P_3, ..., P_{36}$ as given in FIG. 20, the output priority rank to show which dot should be turned to ON is given by the output priority matrix 7 (the matrix of FIG. 21 in the example of FIG. 20) of m lines and n rows (6 lines and 6 rows), and the density pattern to all of r is given. If such output priority matrix 7 can be obtained, the density pattern to each value of r can be obtained by turning the printing dots $3_{(1)}, 3_{(2)}, 3_{(3)}, 3_{(r-1)}, ..., 3_{(36)}$ to ON, which correspond to the output priority.

In the following, description is given on the procedure to obtain the output priority matrix to form the density pattern corresponding to the coordinates (X, Y) to reproduce the binary gradation in case where the mesh is rotated by an arbitrary angle of $\theta$.

In FIG. 7, 30 represents an example of binary gradation reproduction using mesh-like density pattern where the mesh is rotated by an angle of $\theta$ ($\theta = \tan^{-1}(\frac{1}{4}) \neq 14.1°$ in the example of the figure) on the portion of original image where the pixels of $r = 13$ form a plane continuously extending in longitudinal and lateral directions. In the binary gradation reproduction 30, it is the same gradation 13 and is constituted by 16 different types of density pattern 11 by the coordinates (X, Y). These 16 types of density pattern $11_{(e,f)}$ ($1 \leq e \leq 4$, $1 \leq f \leq 4$) forms one block 13 continuous in longitudinal and lateral direction in matrix form of 4 lines and 4 rows. Binary gradation reproduction 30 is continuous by repeating this block 13 in matrix form in longitudinal and lateral directions.

These density patterns $11_{(e,f)}$ are obtained from 16 types of output priority matrix $12_{(e,f)}$ given in FIG. 2 and by turning the printing dots corresponding to the elements of the priority (described later) in each matrix from 1 to 13.

To form such output priority matrix $12_{(e,f)}$, basic output priority matrix 15 (See FIG. 3.) of h lines and i rows (6 lines and 6 rows in the example; i.e. h=m and i=n) is prepared.

The degree of this basic output priority matrix does not necessarily agree with the degree of the matrix of the small group of printing dots 6 to express the gradation and can be arbitrarily selected.

Next, the size of the block 13 is selected according to the given rotating angle $\theta$. As the angle often used as $\theta$, are:

$$\tan^{-1} 1 \neq 45°$$

$$\tan^{-1}(\tfrac{1}{3}) \neq 18.4°,$$

$$\tan^{-1}(\tfrac{1}{4}) \neq 14.1°,$$

FIG. 1 shows the case where $\theta = \tan^{-1}(\tfrac{1}{4}) \neq 14.1°$.

In this case, it should be noted that: (FIG. 4)

$$\tan \theta = (6 \times 1)/(6 \times 4)$$

$$1^2 + 4^2 = (\sqrt{17})^2 \neq (4.12)^2$$

$$4.12 \neq 4$$

Figure 10:
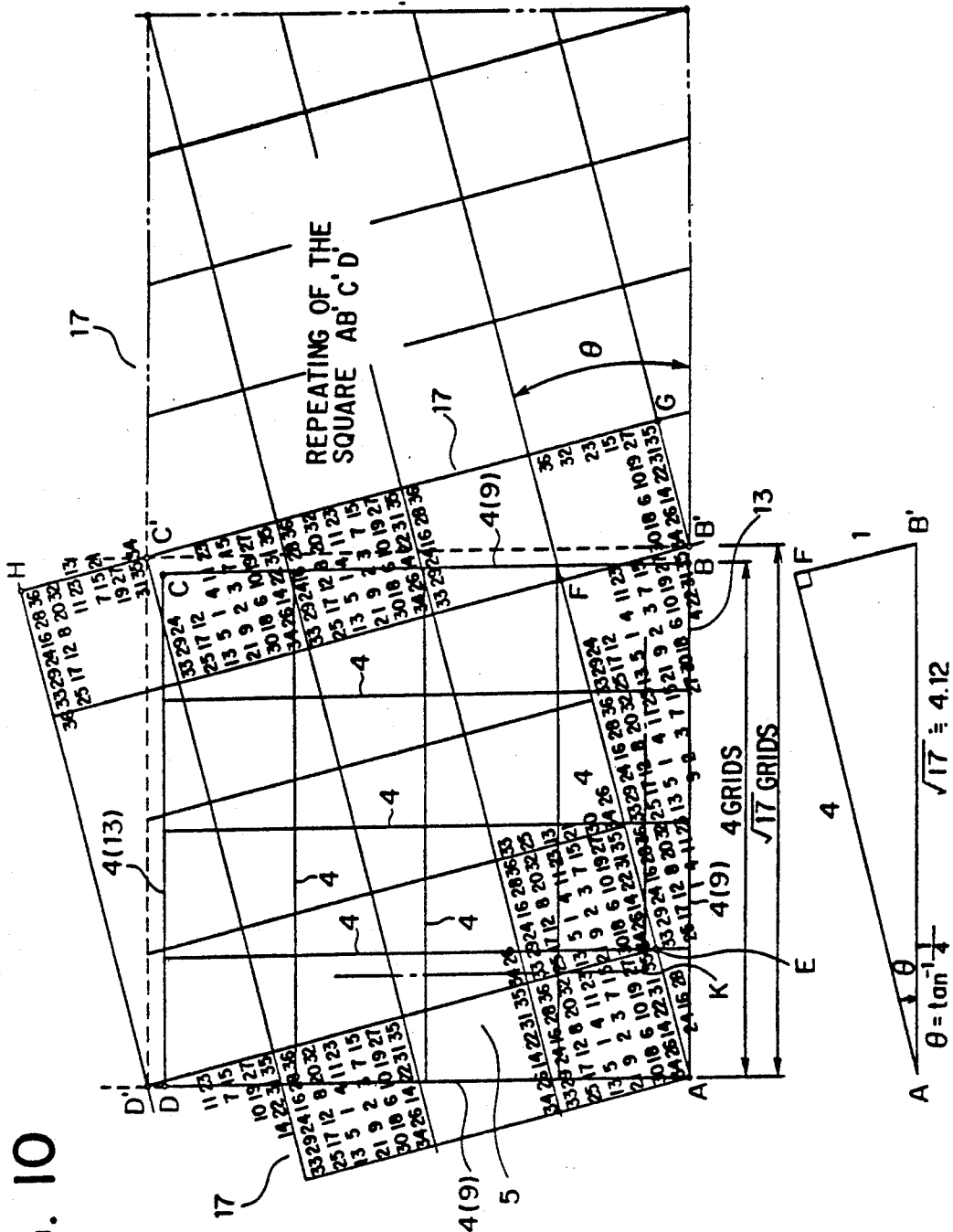
FIG. 10 shows the relation between the cycle and block size (size of repeated unit matrix) of the rotated output priority rank table, where the basic output priority rank table, prepared by continuously repeating the basic output priority matrix of FIG. 9 in the X and Y directions.
Figure 11:
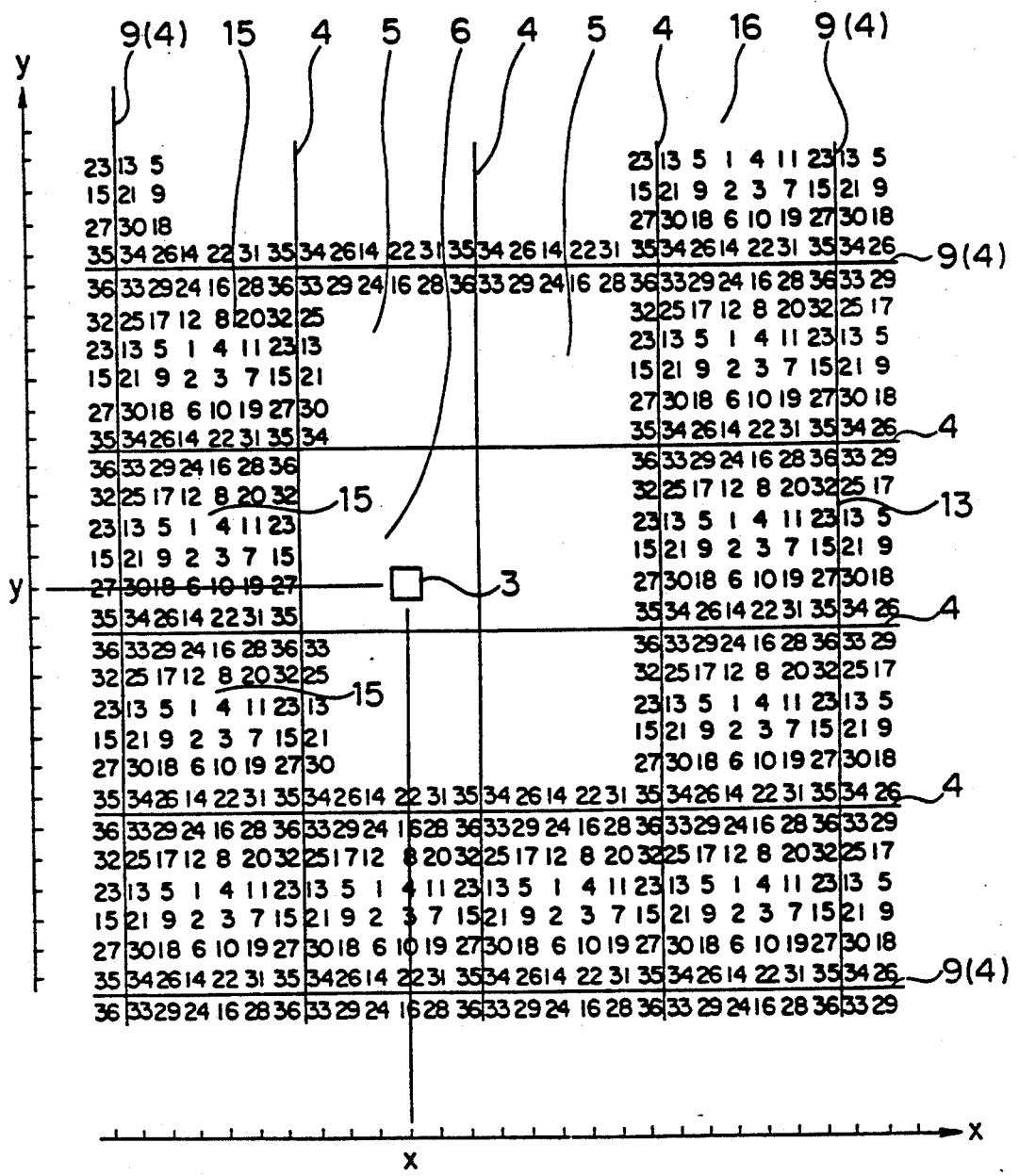
FIG. 11 shows the relationship of the basic output priority rank table, block, grid, printing dots and the coordinates.

Continuously repeating basic output priority matrix 15 in X and Y directions, the elements are arranged with equal spacings in X and Y direction. In such matrix, the spacing of the basic output priority table (FIG. 11) is m/h times of the unit length in y direction and n/i times of the unit length in x direction on a plane of x-y coordinates having a set (x, y) of the row number x and line number y of the group of printing dots as the coordinates and the basic output priority Table 16 (See FIG. 11), and it is rotated by an angle $\theta$ on a plane of x-y coordinates Table 17 (FIG. 10). These elements are approximately allocated to the position of each printing dot, and each of these elements is allocated to the coordinates (x, y) as obtained by rounding off the decimal portion of the coordinates (x', y') of the position on a plane of x-y coordinates of the elements, and this is rotated to provide a rotated output priority temporary table (not shown). As it is evident from FIG. 10, this is provided continuously repeating the square AB'C'D' of the grid having a side of $\sqrt{17} (\neq 4.12)$ by repeating in line direction and row direction. This can be easily shown from the fact that $\triangle D'AE$ is congruent to $\triangle C'B'G$ and $\triangle D'C'H$ is congruent to $\triangle AB'F$.

However, because $AB' = \sqrt{17}$ is an irrational number. If this is allocated to the number of printing dots, which is an integer, it is impossible to allocate however small the pitch of printing dot may be, and it is also impossible to accurately form the rotated halftone dot. Accordingly, the output priority matrix must be furnished as many as the number of pixels in the original image, i.e. for each coordinate (x, y).

In this connection, square ABCD similar to the square AB'C'D is used as a repeated unit instead of the latter.

Specifically, instead of $AB' = \sqrt{17} \neq 4.12$, the number 4, which is an integer closer to $\sqrt{17}$ and the error is at the smallest, is selected as the repeating cycles W, V in X and Y directions, and a rotated halftone dot is formed. In this rotated halftone dot, $0.12 \times 6 = 0.72$ printing dot for about 0.12 grid is rounded off for every 24 printing dots, which correspond to 4 grids of the square ABCD, and the dimension of the halftone dot is smaller by such degree on the connection of the repeating.

Figure 8:
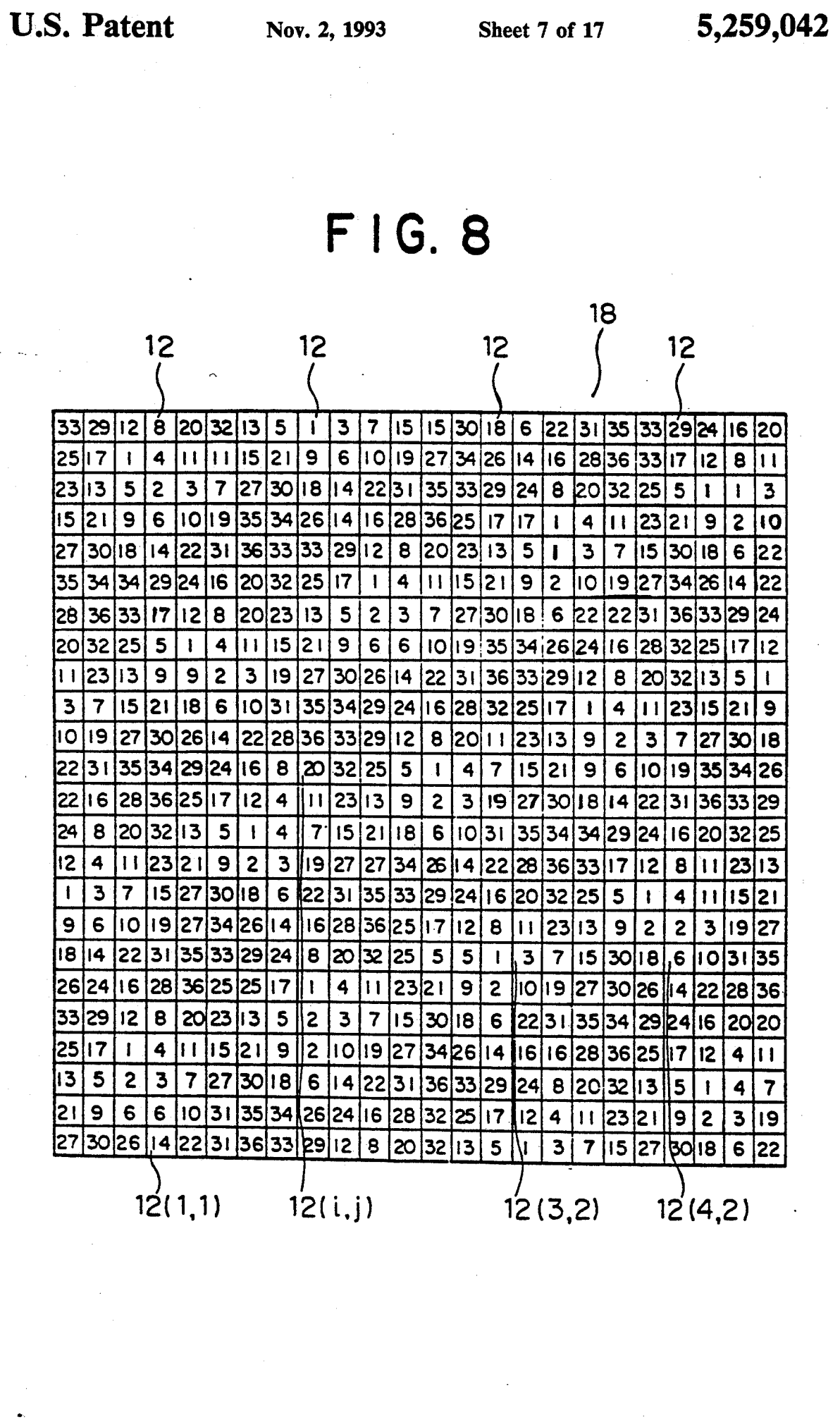

One side of the square ABCD contains 24 printing dots, and the matrix of 24 lines and 24 rows where the element in the rotated output priority provisional table is the element of such position is regarded as the repeated unit matrix 18 (FIG. 8).

The repeated unit matrix 18 can be taken anywhere on x-y coordinates if one side of it contains 24 printing dots, and it can be selected regardless of the position of the partition line 4. Because the relation with the partition line can be selected from 36 types, the repeated unit matrix 18 can be selected by 36 ways in case of FIG. 10.

FIG. 8 shows the repeating unit matrix 18 in case a square having the point K as vertex instead of the vertex A.

This is the case where the procedure to round off the decimal portion of the coordinates is limited to one procedure. When the coordinates (x', y') are rounded off to (x, y) in case of FIG. 8:

$$x = [x']$$

$$y = [y']$$

where [] represents Gauss symbol, and x and y are the largest integers not exceeding x' and y' respectively, whereas the other procedure may be adopted.

Figure 12:
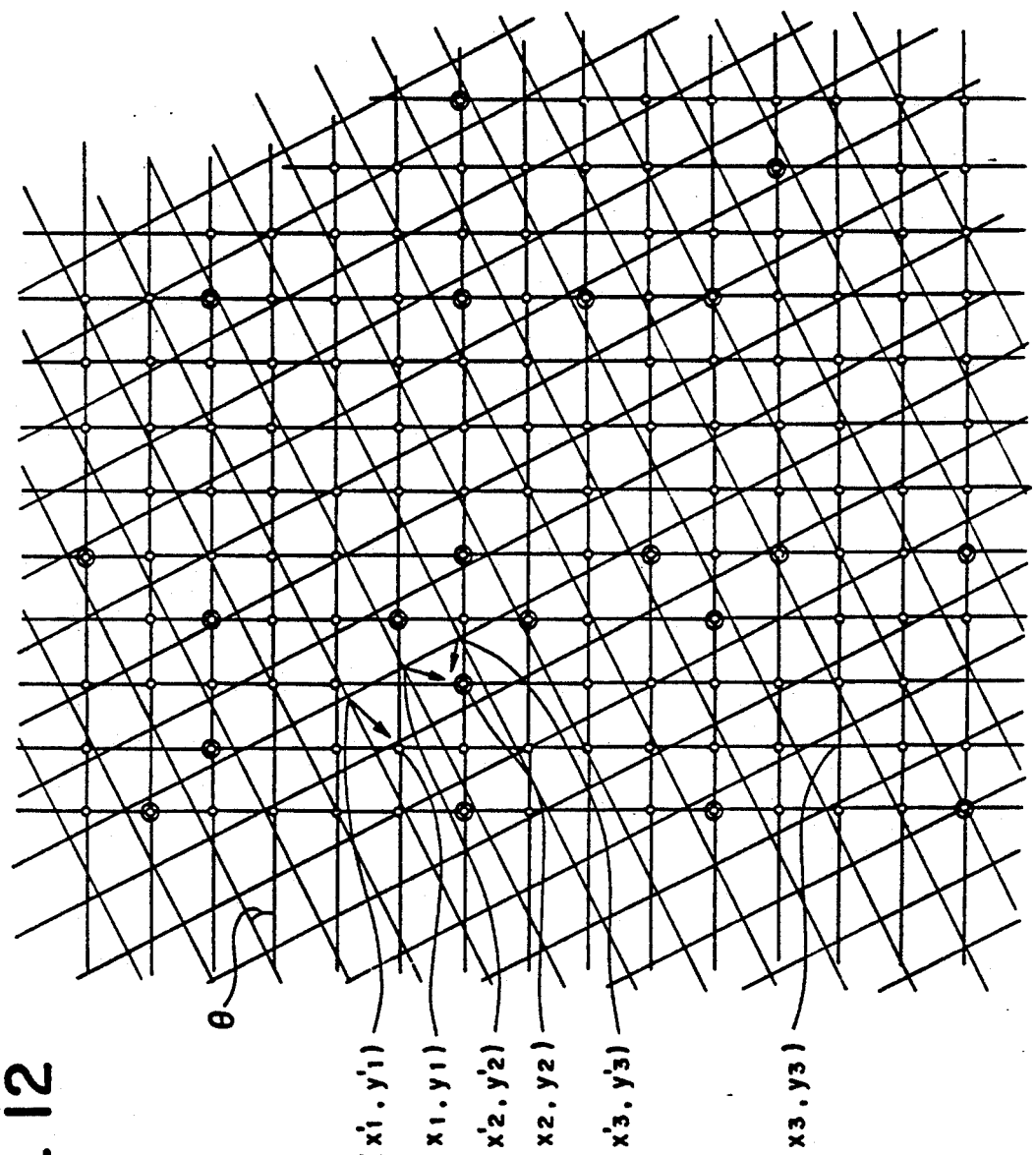
FIG. 12 gives the results of rounding-off of the decimal portion of the coordinates of the elements in order to allocate the elements of the rotated output priority rank table to the actual coordinates of the printing dots.

According to the above rounding procedure, when the point of integer coordinates corresponding to each printing dot (shown by grid points in this figure) is rotated by an angle $\theta$ (In FIG. 12, $\theta$ is given as a general angle and is not equal to $\tan^{-1}(\tfrac{1}{4})$). When the coordinates (x', y') of this point is rounded off to the coordinates (x, y), the relation of (x', y')→(x, y) is not 1:1. In fact, $(x_1', y_1')$ of FIG. 12 correspond to a point $(x_1, y_1)$ [Such points are shown by closed circle.]. There is no case where two points $(x_2', y_2')$ and $(x_3', y_3')$ correspond to a point $(x_2, y_2)$ [Such points are given by a double circle.] or to a point $(x_3, y_3)$ [Such points are shown without marking.].

The procedure to correct this procedure to 1:1 has been already conceived but is not given here. FIG. 8 shows only the results of such correction.

In the repeated unit matrix of FIG. 8, elements are contained in all lines and rows by the correction. If these are divided into partial matrix of 6 lines and 6 rows (output priority matrix 12), one of the elements from 1 to 36 is missing, and the other elements are overlapped as the result (The number of missing or overlapping elements are 1-5.).

In case such output priority matrix 12 is used, the elements are outputted from higher rank, and missing elements are neglected. For the overlapping elements, a certain output rank is determined, and serial number may be allocated anew. For example, in case output priority matrix 12 is obtained as shown in FIG. 7 ($\theta = \tan^{-1}(\frac{3}{4}) \neq 37°$ in this example), the output order is determined as shown below for the overlapped elements:

"Priority is given to the one with smaller line number x. In case x is the same, priority is given to the one with smaller row number y."

The density pattern corresponding to each gradation is determined as shown in FIG. 8.

When the coordinates (X, Y) are given, output priority matrix is allocated to the matrix $11_{(X,Y)}$ of m lines and n rows in the grid, which corresponds to the given coordinates (X, Y) on the rotated output priority table (not shown), which is obtained by continuously repeating the repeated unit matrix 18 in the above block 13 in X and Y directions as repeated unit. Such matrix is equal to $11_{(e,f)}$ (where e or f is one of the integers from 1 to 4).

$$11_{(X,Y)} = 11_{(e,f)}.$$

where $$e = (X-1) \bmod W + 1$$

$$f = (Y-1) \bmod V + 1$$

Therefore, if the corresponding dot is turned to ON one by one for each $11_{(e,f)}$ according to the priority rank and the density pattern obtained each time is preserved, the density pattern corresponding to each of the gradations $r = 0, 1, \ldots, mn$ can be obtained, and it can be outputted when necessary.

FIG. 15 shows the procedure to determine the size of block 13 in case $\theta = 45°$ ($=\tan^{-1}(1/1)$). First, to the angle $\theta$ where $\tan \theta = \tan 45° = 1/1$, a set of integers b, c and d satisfying the following condition is obtained:

$$\tan \theta = (n \cdot c)/(m \cdot b)$$

or $\tan \theta \neq (n \cdot c)/(m \cdot b)$ $$b^2 + c^2 = d^2 \text{ or } b^2 + c^2 \neq d^2$$

As such values of b, c and d, the values b = 5, c = 5 and d = 7 are selected, and V = W = 7 is selected as block size. In this case, the true repeating cycle $\sqrt{b^2+c^2} = \sqrt{50} \neq 7.071$ is 7 (grid) instead of 7.071 (grid). 0.071 (grid) is discarded. The repeating unit matrix in this case is 42 lines and 42 rows (Wm lines and Wn rows), and the output priority matrix is determined to one type from the coordinates of 49 types (7×7=49).

In case $\theta = \tan^{-1}(\frac{1}{3})$, b = 3, c = 1, $\sqrt{b^2+c^2} = \sqrt{10} \neq 3.16$, d = 3, or b = 18, c = 6, $\sqrt{b^2+c^2} = 6\sqrt{10} \neq 18.97$, d = 19, or b = 21, c = 7, $\sqrt{b^2+c^2} = 7\sqrt{10} \neq 22.14$, d = 22. When V = W = 19 is selected as block size, output priority matrix comes in 361 types (19×19=361). The error of the repeating cycle is as small as 0.03 (grid). In this case, 0.03 (grid) is not discarded, but the initial part of the repeated portion is overlapped to the slightest extent.

In case of $\theta = \tan^{-1}(\frac{3}{4})$, b = 3, c = 4 and $\sqrt{b^2+c^2} = d = 5$. As block size, V = W = 5 can be selected, and the error of repeating cycle is 0.

Instead of the ideal rotated mesh, using a square with $\sqrt{b^2+c^2}$ as one side is used as repeating cycle, the rotated halftone dot, where a square having d as one side is used as repeating cycle, is prepared. In the rotated halftone dot, a slight difference occurs on the repeating connections, and the mode of difference differs generally between X direction and Y direction.

Figure 17:
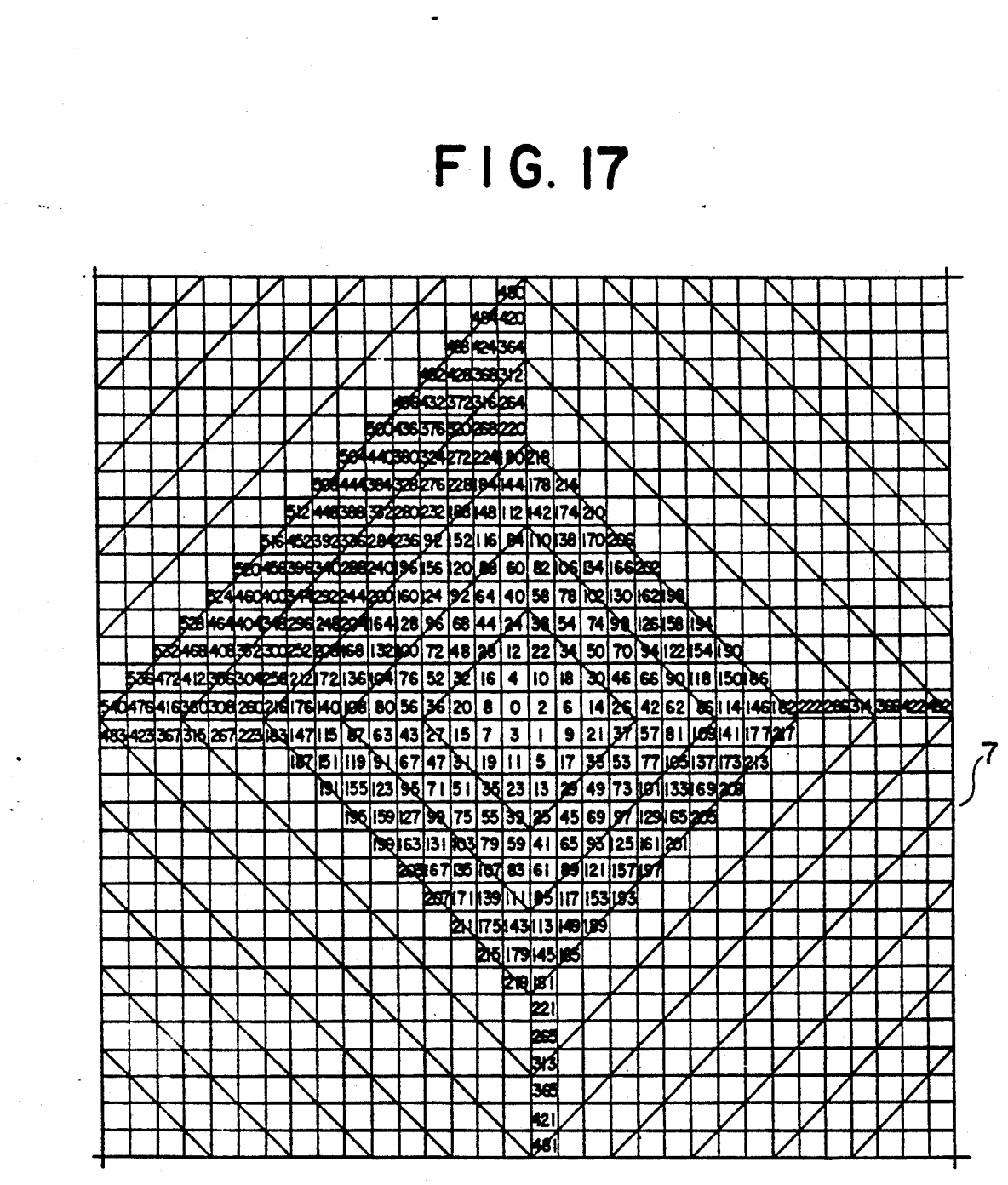

To eliminate the error of the repeating cycle on the repeating connections, the distance between elements of the FIG. 17 can be enlarged or reduced so that one side of the square AB'C'D' is equal to d. That is, basic output priority matrix 15 is continuously repeated in X and Y directions, and the elements are arranged with equal spacings in X and Y directions. In such case, the spacing between the elements is $(d/\sqrt{b^2+c^2}) \cdot m/h$ times of unit length in X direction on x-y coordinate plane in X direction and it is $(d/\sqrt{b^2+c^2}) \cdot n/i$ times of the unit length in y direction on x-y coordinate plane in Y direction. Thus, the same halftone dot as in the other portion is obtained on the repeating connection. More accurately, however, the size of halftone dot is slightly different between the case where the rotating angle $\theta = 0°$ and the case where $\theta \neq 0°$.

In case density pattern is not halftone dot but it is the density pattern where the deformed pattern of the repeating connection is not conspicuous, V = 3 and W = 4 may be selected as block size if $\theta = \tan^{-1}(\frac{3}{4})$.

In case of the density pattern with no conspicuous deformed pattern on the repeating connection, $a = |b|$ and $b = |c|$ to the arbitrary integers u and v in $\tan \theta^{-1} (c/b)$. Further, any natural numbers V and W can be selected as block size to the arbitrary rotating angle $\theta$.

Figure 14:
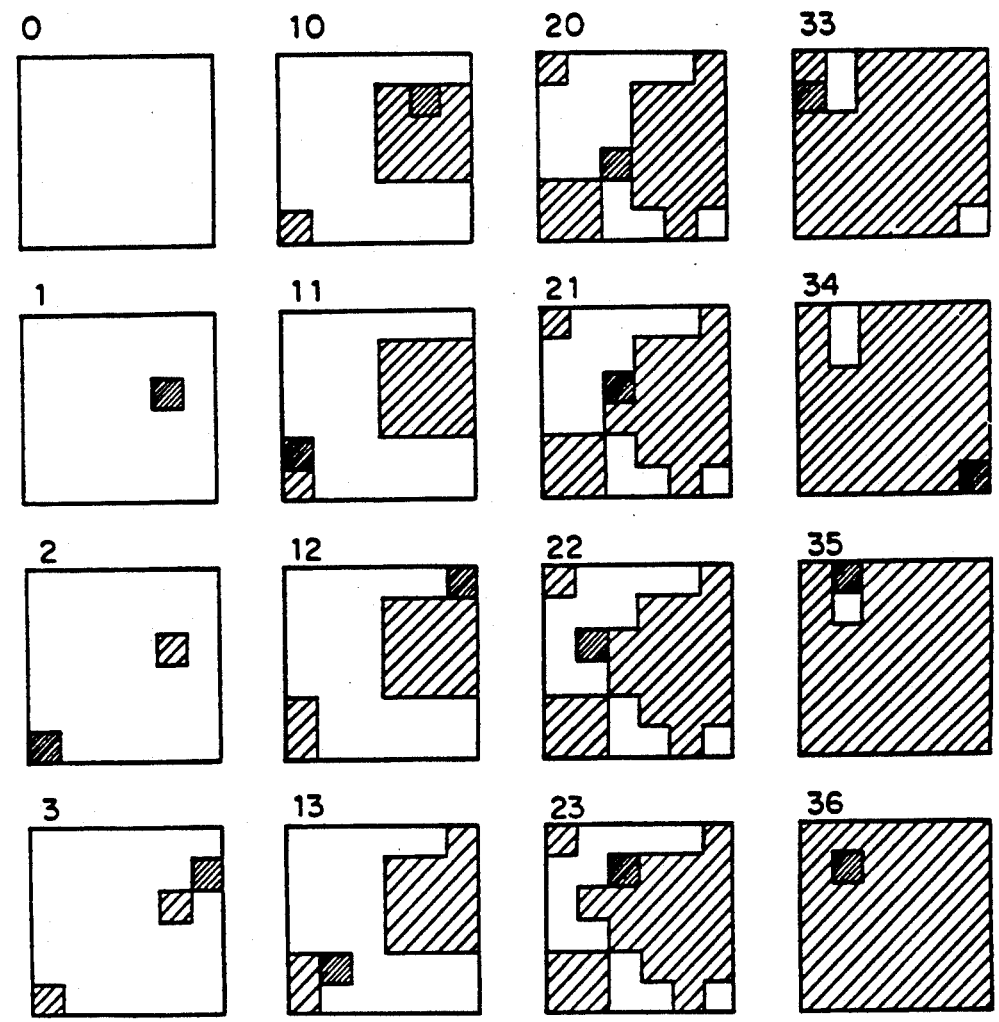
FIG. 14 gives the density pattern as formed by the output priority matrix of FIG. 13.

As it is evident from FIG. 7, the shape of the halftone dot in the rotated mesh is deformed from the shape of halftone dot in the unrotated mesh (with rotating angle of 0°) as shown in FIG. 14.

To reduce this deformation, the size of basic output priority matrix should be increased. FIG. 17 shows an example of basic output priority matrix 7 in case h = 32 lines and i = 32 rows.

In this case, one output priority matrix contains "mn" elements (overlapping allowed) of the output priority ranks as expressed by natural numbers from 1 to hi. By outputting the halftone dots, which correspond to the elements from higher priority rank, the density patterns of the gradations of $0, 1, 2, \ldots,$ mn can be obtained.

As it is evident from the above description, it is possible according to the present invention to output binary values by an equipment provided with insufficient number of printing dots per inch and to express the gradation through the mesh system with decreasing resolution below a certain level and to attain the gradation close to a certain level in case the number of printing dots mn (>1) to express the gradation is not sufficient for the level of the gradation to be expressed. Also, it is possible to express organizational density pattern within each unit because binary output pattern of each pixel is changed by the coordinates of pixels using area-type density expression pattern table of v lines and w rows and dividing the input pixel of v lines and w rows as one image unit. Thus, it is possible to provide a binarization processing method for multivalued image with less moiré.

As it is self-explanatory from the above description, it is possible according to the present invention to form the density pattern of any shape including the halftone dot on screen rotated at an arbitrary angle without requiring large size equipment and maintaining the advantage of excellent gradation of the density pattern method and shorter processing time through collective output of a plurality of printing dots. Moreover, it is possible to form the pattern without disturbing gradations and pattern shape, to shorten the processing time without worrisome procedure to prepare density pattern for all pixels, and to provide a method to form density pattern for binary gradation reproduction to prevent moiré.

What we claim is:

1. A binarization processing method for a multi-valued image for reproducing an original image, comprising steps of:

dividing, by an image input unit, the original image into a plurality of multivalued input pixels arranged in matrix form of k lines and l rows;

characterizing the input pixels by gradation values;

expressing, by an image output unit, an output image in the form of a plurality of binary valued dots arranged in matrix form of p lines and q rows;

separating said plurality of binary valued dots into a plurality of virtual meshes arranged in matrix form of k lines and l rows, wherein each mesh consists of a group of said dots in matrix form of m lines and n rows (mn > 1);

classifying the gradation values of the input pixels into "mn+1" hierarchies of $C_0, C_1, \ldots, C_r, \ldots, C_{mn}$ expressed by "mn" printing dots;

providing a reference value $N_r$ ($r=0, 1, \ldots,$ mn) representing the hierarchy $C_r$ ($r=0, 1, \ldots,$ mn) is provided;

establishing a diffusion coefficient matrix;

preparing an area-type density expression pattern table in matrix form of v lines and w rows to represent a group of said dots of m lines and n rows wherein each element expresses a gradation r for each hierarchy $C_r$;

outputting an area-type density expression pattern having line number of (y−1) mod (v)+1 and row number of (x−1) mod (w)+1 to meshes of y line and x row of an output image from the area-type density expression pattern table for a gradation value of $a_{y,x}$ of an individual input pixel of x line and y row;

identifying an error $a_{y,x} - N_r$ for a mesh of the output image in the preceding step;

dispersing the error for a mesh of the output image to pixels surrounding the mesh;

adding the error of the mesh of the output image to the gradation values of the pixels surrounding the mesh according to the sizes of coefficients in the diffusion coefficient matrix, wherein diffusion coefficients relatively correspond to the positions of input pixels; and repeating said steps of outputting, identifying, dispersing and adding to other dot meshes of input pixels with new gradation values so that the error is diffused.

2. A binarization processing method for multi-valued image according to claim 1, wherein said step of preparing an area-type density expression pattern table includes steps of preparing a basic output priority matrix of h lines and i rows having output priority rank for each element thereof;

rotating the basic output priority matrix by repeating said basic output priority matrix in X and Y directions and rotating it by an angle $\theta$; and presenting correspondence of output priority matrices to mesh units of V lines and W rows wherein an element of said output priority matrices corresponds to an equal or a nearest element of a rotated output priority matrix, and wherein, in each mesh, the dots are outputted in an order of element of said output priority matrix according to higher priority to form said area-type density expression pattern table, to enable expressing of density patterns of hierarchy of 0, 1, 2 . . . , mn.

3. A binarization processing method for multi-valued image according to claim 2, wherein the spacings of elements in X and Y directions on said rotated basic output priority matrix are m/h times of the unit length in x direction on a plane of x-y coordinates and n/i times of the unit length in y direction.

4. A binarization processing method for multivalued image according to claim 3, wherein $h \geq m$ and $i \geq n$.

5. A binarization processing method for multi-valued image according to claim 2, wherein (a) $\tan \theta = (n \cdot c)/(m \cdot b)$ or $\tan \theta \approx (n \cdot c)/(m \cdot b)$, and (b) $b^2 + c^2 = d^2$ or $b^2 + c^2 \approx d^2$, $V = W = d$ for a set of integer numbers b, c and d satisfying the conditions (a) and (b).

6. A binarization processing method for multi-valued image according to claim 2, wherein (a) $\tan \theta = (n \cdot c)/(m \cdot b)$ or $\tan \theta \approx (n \cdot c)/(m \cdot b)$, and (b) $b^2 + c^2 = d^2$ or $b^2 + c^2 \approx d^2$, $V = W = d$ for a set of integer numbers b, c and d satisfying the conditions (a) and (b), and the spacings of elements in X and Y directions on said rotated basic output priority matrix are $(d/\sqrt{b^2+c^2}) \cdot (m/h)$ times the unit length in x direction on the x-y coordinate plane, and $(d/\sqrt{b^2+c^2}) \cdot (n/i)$ times of the unit length in y direction.

7. A binarization processing method for multi-valued image according to claim 2, wherein said basic output priority matrix is sequentially arranged from the central portion of the matrix to the peripheral portion from higher priority rank to the lower rank.

8. A binarization processing method for multi-valued image according to claim 2, wherein said rotating angle $\theta$ is 0°.

9. A method for forming a density pattern for reproducing binary gradation in an image using an area-type density expression pattern table, comprising steps of:

producing said area-type density expression pattern table with a basic output priority matrix of h lines and i rows having output priority rank as an element;

rotating said basic output priority matrix by repeating said basic output priority matrix in X and Y directions and rotating it by the angle $\theta$;

establishing an output priority matrix corresponding to mesh units of V lines and W rows in which an element of said output priority matrix corresponds to equal or nearest element of said rotated output priority matrix; and outputting printing dots of the image in the order of elements of said output priority matrix according higher priority for forming said area-type density expression pattern table, said table permitting expression of density patterns of hierarchy of 0, 1, 2 . . . , mn.

10. A method to form density pattern for reproducing binary gradation using an area-type density expression pattern table according to claim 9, further comprising spacing said elements in X and Y directions on a rotated basic output priority matrix with spacing m/h times a unit length in x direction on a plane of x-y coordinates and n/i times a unit length in y direction.

11. A method to form density pattern for reproducing binary gradation using an area-type density expression pattern table according to claim 10, wherein $h \geq m$, and $i \geq n$.

12. A method to form density pattern for reproducing binary gradation using an area-type density expression pattern table according to claim 9, wherein
  (a) $\tan \theta = (n \cdot c)/(m \cdot b)$, or $\tan \theta \approx (n \cdot c)/(m \cdot b)$ and (b) $b^2 + c^2 = d^2$ or $b^2 + c^2 \approx d^2$, $V = W = d$ for a set of integer numbers b, c and d satisfying the conditions (a) and (b).

13. A method to form density pattern for reproducing binary gradation using an area-type density expression pattern table according to claim 9, wherein
  (a) $\tan \theta = (n \cdot c)/(m \cdot b)$, or $\tan \theta \approx (n \cdot c)/(m \cdot b)$ and (b) $b^2 + c^2 = d^2$ or $b^2 + c^2 \approx d^2$, $V = W = d$ for a set of integer numbers b, c and d satisfying the conditions (a) and (b), and spacings of elements in X and Y directions on a rotated basic output priority matrix are $(d/\sqrt{b^2+c^2}) \cdot (m/h)$ times a unit length in x direction on the x-y coordinate plane, and $(d/\sqrt{b^2+c^2}) \cdot (n/i)$ times a unit length in y direction.

14. A method to form density pattern for reproducing binary gradations using an area-type density expression pattern table according to claim 9, wherein said basic output priority matrix is sequentially arranged from the central portion of the matrix to the peripheral portion from higher priority rank to the lower rank.

15. A method to form density pattern for reproducing binary gradations using an area-type density expression pattern table according to claim 9, wherein said rotating angle $\theta$ is 0°.

* * * * *